United States Patent
Du et al.

(10) Patent No.: US 11,811,350 B2
(45) Date of Patent: Nov. 7, 2023

(54) MOTOR CONTROL SYSTEM AND MOTOR CONTROL APPARATUS

(71) Applicant: BYD COMPANY LIMITED, Shenzhen (CN)

(72) Inventors: Zhiyong Du, Shenzhen (CN); Luhui Xu, Shenzhen (CN); Yilong Yu, Shenzhen (CN); Axi Qi, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/787,731

(22) PCT Filed: Nov. 25, 2020

(86) PCT No.: PCT/CN2020/131440
§ 371 (c)(1),
(2) Date: Jun. 21, 2022

(87) PCT Pub. No.: WO2021/135738
PCT Pub. Date: Jul. 8, 2021

(65) Prior Publication Data
US 2023/0076368 A1 Mar. 9, 2023

(30) Foreign Application Priority Data
Dec. 31, 2019 (CN) .......................... 201911417122.X (51) Int. Cl.
*H02P 3/06* (2006.01)
*H02P 23/14* (2006.01)

(52) U.S. Cl.
CPC ................ *H02P 3/06* (2013.01); *H02P 23/14* (2013.01)

(58) Field of Classification Search
CPC .......... H02P 3/06; H02P 23/14; H02P 29/024; H02P 29/028; B60L 3/003; B60L 15/20
(Continued)

(56) References Cited

U.S. PATENT DOCUMENTS 5,550,736 A * 8/1996 Hay ...................... G06F 11/184
714/E11.061
7,671,548 B2 * 3/2010 Pasuri ...................... H02P 5/46
700/95

(Continued)

FOREIGN PATENT DOCUMENTS

CN 201256376 Y 6/2009
CN 202043071 U 11/2011
(Continued)

OTHER PUBLICATIONS

The World Intellectual Property Organization (Wipo) International Search Report for PCT/CN2020/131440 dated Feb. 25, 2021 4 pages (with translation).
(Continued)

*Primary Examiner* — David Luo
(74) *Attorney, Agent, or Firm* — Wenye Tan (57) ABSTRACT

A motor control system includes a drive unit, a backup control unit, and a power unit. The drive unit is electrically connected to the power unit, and is configured to convert a received low-voltage drive signal into a high-voltage drive signal and output the high-voltage drive signal to the power unit. The power unit outputs, according to the high-voltage drive signal, a power supply drive signal provided by a high-voltage battery. The power supply drive signal is configured to drive a motor connected to the power unit to rotate. The backup control unit is electrically connected to the drive unit. The drive unit is configured to output a diagnosis signal indicating a running status of the drive unit to the backup control unit.

11 Claims, 2 Drawing Sheets

(58) Field of Classification Search
USPC .................................................... 318/490, 34
See application file for complete search history.

(56) References Cited

U.S. PATENT DOCUMENTS

| | | | |
|---|---|---|---|
| 9,948,219 B2* | 4/2018 | Saha | ................ H02P 27/06 |
| 2011/0050136 A1* | 3/2011 | Sumi | ................ B60L 53/20 |
| | | | 318/400.3 |
| 2013/0328514 A1 | 12/2013 | Funaba et al. | |
| 2014/0092655 A1 | 4/2014 | Igarashi et al. | |
| 2015/0214863 A1 | 7/2015 | Sumi et al. | |

FOREIGN PATENT DOCUMENTS

| | | |
|---|---|---|
| CN | 102859859 A | 1/2013 |
| CN | 104283485 A | 1/2015 |
| CN | 104283486 A | 1/2015 |
| CN | 205647308 U | 10/2016 |
| CN | 107124124 A | 9/2017 |
| CN | 107786150 A | 3/2018 |
| CN | 208401757 U | 1/2019 |
| CN | 208479500 U | 2/2019 |
| CN | 110266245 A | 9/2019 |
| JP | 2003322042 A | 11/2003 |
| JP | 2009219174 A | 9/2009 |

OTHER PUBLICATIONS

Texas Instruments:"Inverter PWM signals Isolated IGBT Gate Driver Evaluation Platform for 3-Phase Inverter System" May 30, 2015 (May 30, 2015), XP055397784, retrieved from the Internet: URL :http://www.ti.com/lit/ug/t±dual5a/tidual5a.pdf [retrieved on Aug. 10, 2017] * figures 1, 13, 16 *.

* cited by examiner

MOTOR CONTROL SYSTEM AND MOTOR CONTROL APPARATUS

CROSS-REFERENCE TO RELATED APPLICATIONS

This application is a national stage entry under 35 U.S.C. § 371 of International Application No. PCT/CN2020/131440, filed on Nov. 25, 2020, claims priority to Chinese Patent Application No. 201911417122.X, entitled "MOTOR CONTROL SYSTEM AND MOTOR CONTROL APPARATUS" and filed on Dec. 31, 2019, the entire contents of all which are incorporated herein by reference.

FIELD

The present disclosure relates to the field of motor control, and more specifically, to a motor control system and a motor control apparatus.

BACKGROUND

With the rapid development of electric vehicles, drive control of a motor as one of the core devices of an electric vehicle also receives more and more attention.

In a current motor control system, the functions and performance of motors are mostly designed, but there is no adequate consideration for the safety of motors, which makes it difficult to reach a higher safety level when a conventional motor control system is applied to an electric vehicle.

SUMMARY

The present disclosure aims at resolving one of the technical problems in the related art at least to some extent.

Therefore, in a first aspect, an embodiment of the present disclosure provides a motor control system, including a drive unit, a backup control unit, and a power unit. The drive unit is electrically connected to the power unit, and is configured to convert a received low-voltage drive signal into a high-voltage drive signal and output the high-voltage drive signal to the power unit. The power unit outputs, according to the high-voltage drive signal, a power supply drive signal provided by a high-voltage battery. The power supply drive signal is configured to drive a motor connected to the power unit to rotate. The backup control unit is electrically connected to the drive unit. The drive unit is configured to output a diagnosis signal indicating a running status of the drive unit to the backup control unit. If the diagnosis signal received by the backup control unit indicates that the drive unit is in a fault state, the backup control unit controls the drive unit to stop working, so that the drive unit stops outputting the high-voltage drive signal to the power unit, to control the motor to stop rotating.

In a second aspect, an embodiment of the present disclosure provides a motor control apparatus, including the foregoing motor control system.

In the motor control system according to this embodiment of the present disclosure, a switching unit is added to a power providing unit and switches between a first direct current voltage outputted by a battery unit and a third direct current voltage outputted by a first transformation unit for outputting, to switch from one signal to another signal in time when the one signal encounters a fault, thereby improving the power providing safety of an electric apparatus to which the motor control system is applied during running. In addition, a backup control unit is further added to the motor control system, which can form a redundant fault control structure with the control unit when the drive unit encounters a fault. That is, when the control unit fails to stop the drive unit from working, the backup control unit can control the drive unit to stop working. It can be learned that in the motor control system, through the improvement of the power providing unit and the addition of the backup control unit, the safety level of the electric apparatus to which the motor control system is applied is improved.

BRIEF DESCRIPTION OF THE DRAWINGS

To describe the technical solutions in embodiments of the present disclosure more clearly, the following briefly describes accompanying drawings required for describing the embodiments. Apparently, the accompanying drawings in the following description show merely some embodiments of the present disclosure, and a person of ordinary skill in the art can still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely some of the embodiments of the present disclosure rather than all of the embodiments. All other embodiments obtained by a person of ordinary skill in the art based on the embodiments of the present disclosure without creative efforts shall fall within the protection scope of the present disclosure.

Descriptions of the following embodiments are made with reference to the accompanying drawings, to exemplarily describe the specific embodiments of the present disclosure that can be implemented. The directional terms mentioned in the present disclosure, such as "upper", "lower", "front", "rear", "left", "right", "inner", "outer" and "side" are only directions with reference to the accompanying drawings. Therefore, the directional terms used intend to describe and understand the present disclosure better and more clearly, rather than indicating or implying that the apparatus or element should have a particular orientation, or be constructed and operated in a particular orientation, and therefore should not be construed as a limitation on the present disclosure. In the description of the present disclosure, it should be noted that, unless otherwise explicitly specified or defined, the terms such as "install", "connect", and "connection" should be understood in a broad sense. For example, the connection may be a fixed connection, a detachable connection, or an integral connection; or the connection may be a mechanical connection; or the connection may be a direct connection, an indirect connection through an intermediary, or internal communication between two components. A person of ordinary skill in the art may understand the specific meanings of the foregoing terms in the present disclosure according to specific situations.

"Of" and "corresponding" may be mixed during use sometimes. It should be noted that when a difference thereof is de-emphasized, meanings expressed by them are the same. In addition, for ease of describing the technical solutions in the embodiments of the present disclosure clearly, in the embodiments of the present disclosure, terms such as "first" and "second" are used to distinguish same or similar items with a basically same function and purpose. A person skilled in the art may understand that the terms such as "first" and "second" do not define a quantity and an execution sequence, and the terms such as "first" and "second" do not indicate a definite difference. In addition, the terms "include", "have", and any variant thereof are intended to cover a non-exclusive inclusion.

Compared with a conventional fuel vehicle, the movement of an electric vehicle is implemented through an electric motor supported by pure electricity. During the running of the electric motor, important parameters such as a rotational speed, a current, and a voltage all need to be monitored and controlled by a motor control system. Therefore, a motor control system with a high safety level can further improve the safety and stability of the electric vehicle during running.

Figure 1:
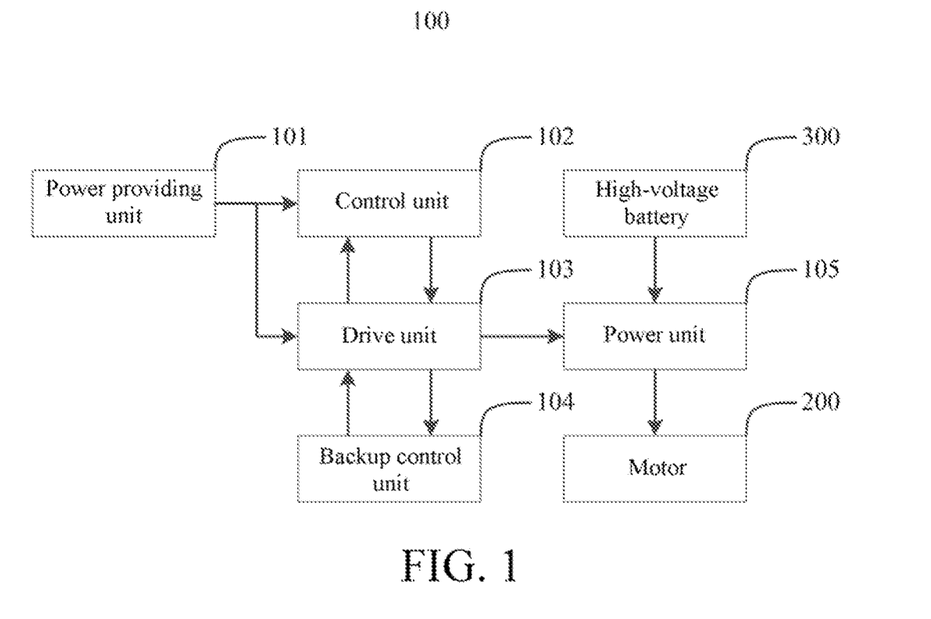
FIG. 1 is a schematic structural diagram of a motor control system according to an embodiment of the present disclosure.

FIG. 1 is a schematic structural diagram of a motor control system according to an embodiment of the present disclosure. As shown in FIG. 1, the motor control system 100 includes a power providing unit 101, a control unit 102, a drive unit 103, a backup control unit 104, and a power unit 105.

The power providing unit 101 is electrically connected to the control unit 102 and the drive unit 103, and is configured to provide a first power supply signal for the control unit 102. The control unit 102 controls the drive unit 103 under a driving action of the first power supply signal, and is further configured to provide a first power supply signal and a second power supply signal to the drive unit 103. The drive unit 103 works under simultaneous driving actions of the first power supply signal and the second power supply signal.

The control unit 102 is electrically connected to the drive unit 103, and is configured to output an enable signal and a low-voltage drive signal to the drive unit 103 when working under the driving action of the first power supply signal.

The drive unit 103 is electrically connected to the power unit 105, and is configured to: receive the enable signal and the low-voltage drive signal when working under simultaneous driving actions of the first power supply signal and the second power supply signal, start, according to a first potential of the enable signal, converting the low-voltage drive signal into a high-voltage drive signal, output the high-voltage drive signal to the power unit 105, and stop, according to a second potential of the enable signal, converting the low-voltage drive signal into the high-voltage drive signal.

When a fault occurs, the drive unit 103 is further configured to output a fault signal to the control unit 102. The control unit 102 changes the enable signal from the first potential to the second potential according to the received fault signal, and stops outputting the low-voltage drive signal to the drive unit 103.

The power unit 105 is electrically connected to a high-voltage battery 300 and a motor 200, and is configured to output, under a control action of the high-voltage drive signal outputted by the drive unit 103, a power supply drive signal provided by the high-voltage battery 300 to the motor 200. The power supply drive signal is used for driving the motor 200 to rotate.

The drive unit 103 is electrically connected to the backup control unit 104, and is configured to output a diagnosis signal indicating a running status of the drive unit 103 to the backup control unit 104. The running status includes a fault state and a non-fault state. Therefore, the backup control unit 104 adjusts, according to a potential change of the diagnosis signal, a potential of a backup control signal outputted to the drive unit 103, so that the drive unit 103 outputs or stops outputting the high-voltage drive signal to the power unit 105.

Further, if the drive unit 103 is in the non-fault state, the diagnosis signal outputted by the drive unit to the backup control unit 104 is at the first potential, and the backup control signal outputted by the backup control unit 104 is at the first potential, so that the drive unit 103 continues outputting the high-voltage drive signal to the power unit 105. If the drive unit 103 is in the fault state, the diagnosis signal outputted by the drive unit to the backup control unit 104 changes from the first potential to the second potential, and the backup control signal outputted by the backup control unit 104 is at the second potential, so that the drive unit 103 stops outputting the high-voltage drive signal to power unit 105.

In this embodiment of the present disclosure, the drive unit 103 includes a detection circuit configured to detect a running status of the drive unit, so that the drive unit 103 may output the fault signal to the control unit 102 when a fault occurs, and convert the diagnosis signal from the first potential to the second potential.

In this embodiment of the present disclosure, there are at least two manners of stopping the drive unit 103 from working. In one manner, the backup control unit 104 may control, by monitoring the running status of the drive unit 103 in real time, the drive unit to stop working when the drive unit 103 encounters a fault. In another manner, when the drive unit 103 encounters a fault, the control unit 102 may receive the fault signal outputted by the drive unit 103, and stop, according to the fault signal, outputting the enable signal and the low-voltage drive signal to the drive unit 103, so that the drive unit 103 stops working. In the two manners, a redundant control structure is formed for the fault processing of the drive unit 103, so that when the control unit 102 fails to control the drive unit 103 in time to stop working due to reasons such as power providing, the backup control unit 104 can make the drive unit 103 stop working. In this way, the motor control system 100 has a higher safety level.

In this embodiment of the present disclosure, the enable signal includes an upper bridge arm enable signal, a lower bridge arm enable signal, and a safety enable signal. The low-voltage drive signal includes an upper bridge arm low-voltage drive signal and a lower bridge arm low-voltage drive signal. The high-voltage drive signal includes an upper bridge arm high-voltage drive signal and a lower bridge arm high-voltage drive signal. The fault signal includes an upper bridge arm fault signal and a lower bridge arm fault signal. The diagnosis signal includes an upper bridge arm diagnosis signal, a lower bridge arm diagnosis signal, a first power supply diagnosis signal, and a second power supply diagnosis signal. The backup control signal includes a first backup control signal and a second backup control signal.

Figure 2:
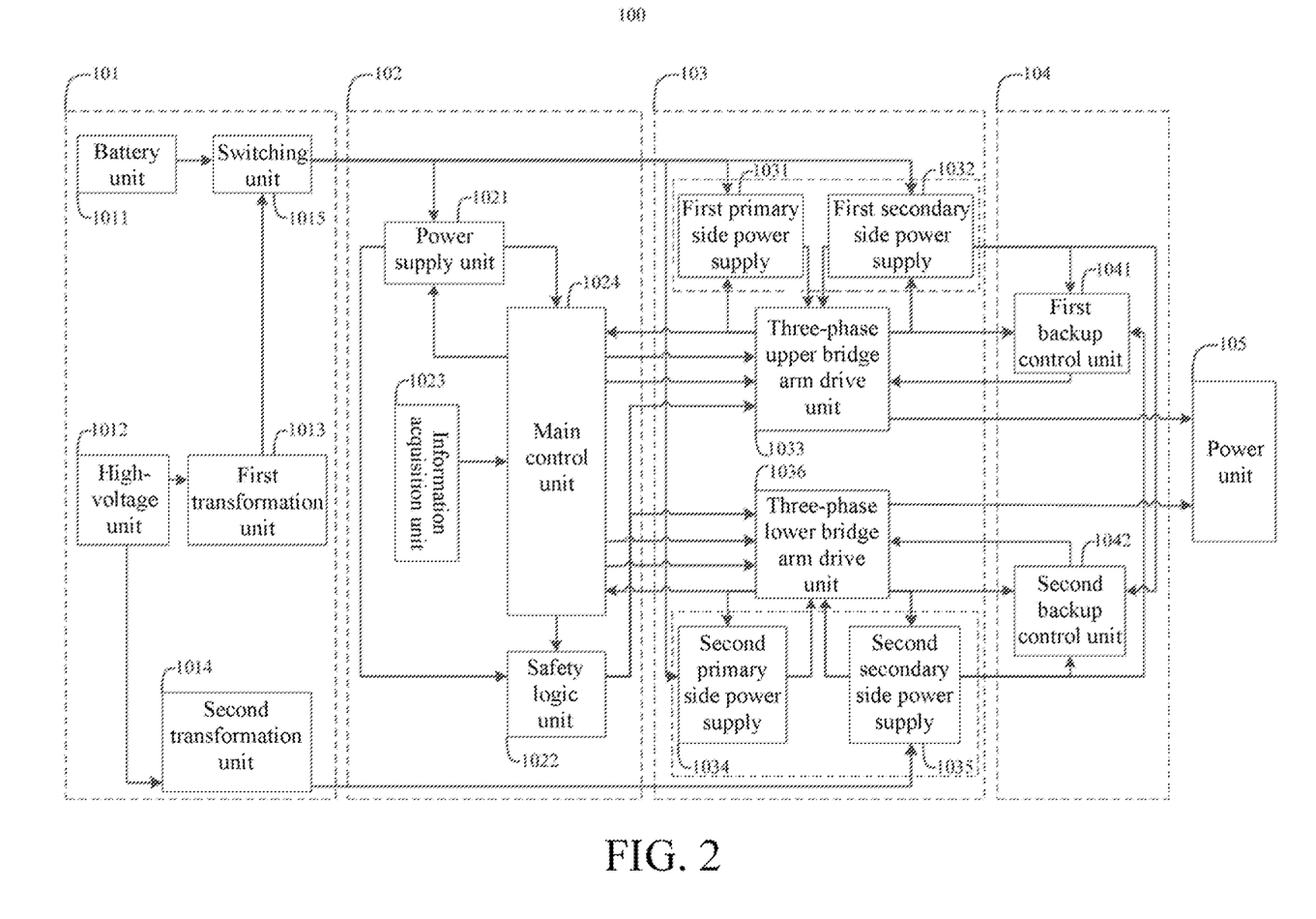
FIG. 2 is a specific schematic structural diagram of the motor control system shown in FIG. 1.

Specifically, FIG. 2 is a specific schematic structural diagram of the motor control system shown in FIG. 1. As shown in FIG. 2, the power providing unit 101 includes a battery unit 1011, a high-voltage unit 1012, a first transformation unit 1013, a second transformation unit 1014, and a switching unit 1015.

The battery unit 1011 is electrically connected to the switching unit 1015, and is configured to output a first direct current voltage to the switching unit 1015.

The high-voltage unit 1012 is electrically connected to the first transformation unit 1013, and is configured to output a second direct current voltage to the first transformation unit 1013.

The first transformation unit 1013 is electrically connected to the switching unit 1015, and is configured to: receive the second direct current voltage outputted by the high-voltage unit 1012, and output a third direct current voltage to the switching unit 1015 after transforming the second direct current voltage.

The switching unit 1015 is electrically connected to the control unit 102 and the drive unit 103, is configured to output the first direct current voltage as the first power supply signal to the control unit 102 and the drive unit 103 when the first direct current voltage is in a threshold range, and is further configured to output the third direct current voltage as the first power supply signal to the control unit 102 and the drive unit 103 when the first direct current voltage exceeds the threshold range.

The high-voltage unit 1012 is further electrically connected to the second transformation unit 1014, and is configured to output the second direct current voltage to the second transformation unit 1014.

The second transformation unit 1014 is further electrically connected to the drive unit 103, and is configured to: receive the second direct current voltage outputted by the high-voltage unit 1012, and output the second power supply signal to the drive unit 103 after transforming the second direct current voltage.

In this embodiment of the present disclosure, the threshold range is a value range. Provided that the value of the first direct current voltage is within the range, the switching unit 1015 outputs the first direct current voltage as the first power supply signal, or otherwise, outputs the third direct current voltage as the first power supply signal.

In this embodiment of the present disclosure, the switching unit 1015 preferentially outputs the first direct current voltage outputted by the battery unit 2011 as the first power supply signal to the control unit 102 and the drive unit 103. Optionally, the switching unit 1015 may alternatively preferentially output the third direct current voltage outputted by the first transformation unit 1013 as the first power supply signal to the control unit 102 and the drive unit 103.

For example, in a normal state, the threshold range ranges from 9.5 V to 10.5 V. If the first direct current voltage and the third direct current voltage respectively outputted by the battery unit 1011 and the first transformation unit 1013 are both limited to 10 V, the switching unit 1015 outputs the first direct current voltage as the first power supply signal. However, if the first direct current voltage suddenly changes to 9 V, the switching unit 1015 outputs the third direct current voltage as the first power supply signal. The switching unit 1015 implements switching between the first direct current voltage and the third direct current voltage in this manner. The first direct current voltage, the third direct current voltage, and the threshold range may be alternatively set to other values according to actual requirements, which is not specifically limited in this embodiment of the present disclosure.

The control unit 102 includes a power supply unit 1021, a safety logic unit 1022, an information acquisition unit 1023, and a main control unit 1024.

The power supply unit 1021 is electrically connected to the main control unit 1024 and the switching unit 1015 in the power providing unit 101, and is configured to: receive the first power supply signal outputted by the switching unit 1015, and output a main control power supply signal to the main control unit 1024 after processing the first power supply signal, so that the main control unit 1024 works under a driving action of the main control power supply signal.

The power supply unit 1021 is further configured to: receive a main control diagnosis signal outputted by the main control unit 1024, and output or stop outputting the main control power supply signal to the main control unit 1024 according to the main control diagnosis signal. The main control diagnosis signal is used for indicating a working status of the main control unit 1024. The working status of the main control unit includes a fault state and a non-fault state. In the non-fault state, the main control unit 1024 outputs a first potential in the main control diagnosis signal, so that the power supply unit 1021 continues outputting the main control power supply signal. In the fault state, the main control unit 1024 outputs a second potential in the main control diagnosis signal, so that the power supply unit 1021 stops outputting the main control power supply signal.

The main control unit 1024 is electrically connected to the three-phase upper bridge arm drive unit 1033 and the three-phase lower bridge arm drive unit 1036 in the drive unit 103, and when working under the driving action of the main control power supply signal, is configured to: output an upper bridge arm enable signal and an upper bridge arm low-voltage drive signal to the three-phase upper bridge arm drive unit 1033, and output a lower bridge arm enable signal and a lower bridge arm low-voltage drive signal to the three-phase lower bridge arm drive unit 1036.

The main control unit 1024 is further configured to: receive an upper bridge arm fault signal outputted by the three-phase upper bridge arm drive unit 1033 and a lower bridge arm fault signal outputted by the three-phase lower bridge arm drive unit 1036, and under an action of the upper bridge arm fault signal, stop outputting the upper bridge arm low-voltage drive signal and change the upper bridge arm enable signal from the first potential to the second potential, so that the three-phase upper bridge arm drive unit 1033 stops working, and under an action of the lower bridge arm fault signal, stop outputting the lower bridge arm low-voltage drive signal and change the lower bridge arm enable signal from the first potential to the second potential, so that the three-phase lower bridge arm drive unit 1036 stops from working.

The main control unit 1024 is further electrically connected to the information acquisition unit 1023, and is configured to: receive an acquired signal that is outputted by the information acquisition unit 1023 and includes important parameters such as a current, a voltage, and a rotational speed of the motor 200 during running, and adjust the outputted upper bridge arm enable signal, the outputted upper bridge arm low-voltage drive signal, the outputted lower bridge arm enable signal, and the outputted lower bridge arm low-voltage drive signal according to the acquired signal.

The safety logic unit 1022 is electrically connected to the power supply unit 1021 and the main control unit 1024, and is configured to: receive a power supply diagnosis signal outputted by the power supply unit 1021 and the main control diagnosis signal outputted by the main control unit 1024, and output a first potential in the safety enable signal to the three-phase upper bridge arm drive unit 1033 and the three-phase lower bridge arm drive unit 1036 when the power supply diagnosis signal and the main control diagnosis signal are both at the first potential, so that the three-phase upper bridge arm drive unit 1033 and the three-phase lower bridge arm drive unit 1036 work. When changing the respective diagnosis signal from the first potential to the second potential due to a fault, either of the power supply unit 1021 and the main control unit 1024 outputs a second potential in the safety enable signal to the three-phase upper bridge arm drive unit 1033 and three-phase lower bridge arm drive unit 1036, so that the three-phase upper bridge arm drive unit 1033 and the three-phase lower bridge arm drive unit 1036 stop working.

In this embodiment of the present disclosure, when the control unit 102 works normally, the power supply unit 1021 outputs the main control power supply signal to the main control unit 1024 after processing the first power supply signal outputted by the switching unit 1015, so that the main control unit 1024 drives an internal device to work, outputs the upper bridge arm enable signal and the upper bridge arm low-voltage drive signal to the three-phase upper bridge arm drive unit 1033, and outputs the lower bridge arm enable signal and the lower bridge arm low-voltage drive signal to the three-phase lower bridge arm drive unit 1036.

In this embodiment of the present disclosure, when the power supply unit 1021 encounters a fault, the power supply unit 1021 outputs a power supply fault signal to the safety logic unit 1022, and the safety logic unit 1022 changes the safety enable signal from the first potential to the second potential, so that the three-phase upper bridge arm drive unit 1033 and the three-phase lower bridge arm drive unit 1036 in the drive unit 103 stop working.

In this embodiment of the present disclosure, when the main control unit 1024 encounters a fault, the main control unit 1024 converts the main control diagnosis signal inputted to the power supply unit 1021 and the safety logic unit 1022 from the first potential to the second potential, the power supply unit 1021 stops outputting the main control power supply signal, and the safety logic unit 1022 switches the safety enable signal from the first potential to the second potential, so that the three-phase upper bridge arm drive unit 1033 and the three-phase lower bridge arm drive unit 1036 in the drive unit 103 stop working.

The drive unit 103 includes a first primary side power supply 1031, a first secondary side power supply 1032, a three-phase upper bridge arm drive unit 1033, a second primary side power supply 1034, a second secondary side power supply 1035, and a three-phase lower bridge arm drive unit 1036.

The first primary side power supply 1031 is electrically connected to the three-phase upper bridge arm drive unit 1033 and the switching unit 1015 in the power providing unit 101, and is configured to: receive the first power supply signal outputted by the switching unit 1015, and output a first primary side power supply signal to the three-phase upper bridge arm drive unit 1033 according to an action of the first power supply signal.

The first secondary side power supply 1032 is electrically connected to the three-phase upper bridge arm drive unit 1033 and the switching unit 1015 in the power providing unit 101, and is configured to: receive the first power supply signal outputted by the switching unit 1015, and output a first secondary side power supply signal to the three-phase upper bridge arm drive unit 1033 according to the action of the first power supply signal.

The first secondary side power supply 1032 is further electrically connected to the first backup control unit 1041 in the backup control unit 104, and is configured to output a first power supply diagnosis signal to the first backup control unit 1041 after detecting the first power supply signal outputted by the switching unit 1015. The first power supply diagnosis signal is used for indicating a working status of the first power supply signal outputted by the switching unit 1015. The first power supply diagnosis signal includes a first potential and a second potential. The first potential indicates a non-fault state. The second potential indicates a fault state. The fault includes a no-signal state, an overvoltage state, an overcurrent state, a low-voltage state, and other states.

The three-phase upper bridge arm drive unit 1033 is configured to: receive the first primary side power supply signal outputted by the first primary side power supply 1031, and drive, according to an action of the first primary side power supply signal, a device on a primary side of the three-phase upper bridge arm drive unit 1033 to work.

The three-phase upper bridge arm drive unit 1033 is further configured to: receive a first secondary side power supply signal outputted by the first secondary side power supply 1032, and drive, according to an action of the first secondary side power supply signal, a device on a secondary side of the three-phase upper bridge arm drive unit 1033 to work.

The three-phase upper bridge arm drive unit 1033 is further electrically connected to the power unit 105, and is configured to: receive the upper bridge arm enable signal and the upper bridge arm low-voltage drive signal outputted by the main control unit 1024 in the control unit 102, receive the safety enable signal outputted by the safety logic unit 1022, receive the first potential in the upper bridge arm enable signal under simultaneous driving actions of the first primary side power supply signal and the first secondary side power supply signal, to start converting the upper bridge arm low-voltage drive signal into the upper bridge arm high-voltage drive signal, output the upper bridge arm high-voltage drive signal to the power unit 105, and receive the second potential in the upper bridge arm enable signal under the simultaneous driving actions of the first primary side power supply signal and the first secondary side power supply signal, to stop converting the upper bridge arm low-voltage drive signal into the upper bridge arm high-voltage drive signal.

The three-phase upper bridge arm drive unit 1033 is further electrically connected to the first backup control unit 1041 in the backup control unit 104, and is configured to output the upper bridge arm diagnosis signal indicating a working status of the three-phase upper bridge arm drive unit 1033. The upper bridge arm diagnosis signal includes a first potential and a second potential. The first potential indicates a non-fault state, and the second potential indicates a fault state.

The three-phase upper bridge arm drive unit 1033 is further configured to: receive the first backup control signal outputted by the first backup control unit 1041, work according to the first potential of the first backup control signal, and stop working according to the second potential of the first backup control signal.

The three-phase upper bridge arm drive unit 1033 is further configured to output the upper bridge arm fault signal to the first primary side power supply 1031, so that the first primary side power supply 1031 stops outputting the first primary side power supply signal to the primary side of the three-phase upper bridge arm drive unit 1033 when receiving the upper bridge arm fault signal.

The three-phase upper bridge arm drive unit 1033 is further configured to output the upper bridge arm diagnosis signal to the first secondary side power supply 1032, so that when the upper bridge arm diagnosis signal received by the first secondary side power supply 1032 suddenly changes from the first potential indicating the non-fault state to the second potential indicating the fault state, the first secondary side power supply stops outputting the first secondary side power supply signal to the secondary side of the three-phase upper bridge arm drive unit 1033.

In this embodiment of the present disclosure, the three-phase upper bridge arm drive unit 1033 includes an upper bridge arm primary side (not shown in the figure), an iron core (not shown in the figure), and an upper bridge arm secondary side (not shown in the figure). The upper bridge arm primary side is configured to receive the first primary side power supply signal, the upper bridge arm enable signal, the upper bridge arm low-voltage drive signal, and the safety enable signal, and is further configured to output the upper bridge arm fault signal to the main control unit 1024. The upper bridge arm secondary side is configured to receive the first secondary side power supply signal and the first backup control signal, and is further configured to output the upper bridge arm diagnosis signal to the first backup control unit 1041 and output the upper bridge arm high-voltage drive signal to the power unit 105.

The second primary side power supply 1034 is electrically connected to the three-phase lower bridge arm drive unit 1036 and the switching unit 1015 in the power providing unit 101, and is configured to: receive the first power supply signal outputted by the switching unit 1015, and output a second primary side power supply signal to the three-phase lower bridge arm drive unit 1036 according to the action of the first power supply signal.

The second secondary side power supply 1035 is electrically connected to the three-phase lower bridge arm drive unit 1036 and the second transformation unit 1014 in the power providing unit 101, and is configured to: receive the second power supply signal outputted by the second transformation unit 1014, and output a second secondary side power supply signal to the three-phase lower bridge arm drive unit 1036 according to an action of the second power supply signal.

The second secondary side power supply 1035 is further electrically connected to the second backup control unit 1042 in the backup control unit 104, and is configured to output a second power supply diagnosis signal to the second backup control unit 1042 after detecting the second power supply signal outputted by the second transformation unit 1014. The second power supply diagnosis signal is used for indicating a working status of the second power supply signal outputted by the second transformation unit 1014. The second power supply diagnosis signal includes a first potential and a second potential. The first potential indicates a non-fault state. The second potential indicates a fault state. The fault includes a no-signal state, an overvoltage state, an overcurrent state, a low-voltage state, and other states.

The three-phase lower bridge arm drive unit 1036 is configured to: receive the second primary side power supply signal outputted by the second primary side power supply 1034, and drive, according to an action of the second primary side power supply signal, a device on a primary side of the three-phase lower bridge arm drive unit 1036 to work.

The three-phase lower bridge arm drive unit 1036 is further configured to: receive the second secondary side power supply signal outputted by the second secondary side power supply 1035, and drive, according to an action of the second secondary side power supply signal, a device on a secondary side of the three-phase lower bridge arm drive unit 1036 to work.

The three-phase lower bridge arm drive unit 1036 is further electrically connected to the power unit 105, and is configured to: receive the lower bridge arm enable signal and the lower bridge arm low-voltage drive signal outputted by the main control unit 1024 in the control unit 102, receive the safety enable signal outputted by the safety logic unit 1022, receive the first potential in the lower bridge arm enable signal under simultaneous driving actions of the second primary side power supply signal and the second secondary side power supply signal, to start converting the lower bridge arm low-voltage drive signal into the lower bridge arm high-voltage drive signal, output the lower bridge arm high-voltage drive signal to the power unit 105, and receive the second potential in the lower bridge arm enable signal under the simultaneous driving actions of the second primary side power supply signal and the second secondary side power supply signal, to stop converting the lower bridge arm low-voltage drive signal into the lower bridge arm high-voltage drive signal.

The three-phase lower bridge arm drive unit 1036 is further electrically connected to the second backup control unit 1042 in the backup control unit 104, and is configured to output the lower bridge arm diagnosis signal indicating a working status of the three-phase lower bridge arm drive unit 1036. The lower bridge arm diagnosis signal includes a first potential and a second potential. The first potential indicates a non-fault state. The second potential indicates a fault state.

The three-phase lower bridge arm drive unit 1036 is further configured to: receive the second backup control signal outputted by the second backup control unit 1042, work according to the first potential of the second backup control signal, and stop working according to the second potential of the second backup control signal.

The three-phase lower bridge arm drive unit 1036 is further configured to output the lower bridge arm fault signal to the second primary side power supply 1034, so that the second primary side power supply 1034 stops outputting the second primary side power supply signal to the primary side of the three-phase lower bridge arm drive unit 1036 when receiving the lower bridge arm fault signal.

The three-phase lower bridge arm drive unit 1036 is further configured to output the lower bridge arm diagnosis signal to the second secondary side power supply 1035, so that when the lower bridge arm diagnosis signal received by the second secondary side power supply 1035 suddenly changes from the first potential to the second potential, the second secondary side power supply stops outputting the second secondary side power supply signal to the secondary side of the three-phase lower bridge arm drive unit 1036.

In this embodiment of the present disclosure, the three-phase lower bridge arm drive unit 1036 includes a lower bridge arm primary side (not shown in the figure), an iron core (not shown in the figure), and a lower bridge arm secondary side (not shown in the figure). The lower bridge arm primary side is configured to receive the second primary side power supply signal, the lower bridge arm enable signal, the lower bridge arm low-voltage drive signal, and the safety enable signal, and is further configured to output the lower bridge arm fault signal to the main control unit 1024. The lower bridge arm secondary side is configured to receive the second secondary side power supply signal and the second backup control signal, and is further configured to output the lower bridge arm diagnosis signal to the second backup control unit 1042 and output the lower bridge arm high-voltage drive signal to the power unit 105.

The backup control unit 104 includes a first backup control unit 1041 and a second backup control unit 1042.

The first backup control unit 1041 is electrically connected to the first secondary side power supply 1032, the three-phase upper bridge arm drive unit 1033, and the second secondary side power supply 1035 in the drive unit 103, and is configured to: receive the first power supply diagnosis signal outputted by the first secondary side power supply 1032, the upper bridge arm diagnosis signal outputted by the three-phase upper bridge arm drive unit 1033, and the second power supply diagnosis signal outputted by the second secondary side power supply 1035, and adjust, according to the potentials of the first power supply diagnosis signal, the upper bridge arm diagnosis signal, and the second power supply diagnosis signal, the potential of the first backup control signal outputted to the three-phase upper bridge arm drive unit 1033.

Further, if the first power supply diagnosis signal, the upper bridge arm diagnosis signal, and the second power supply diagnosis signal are all at the first potential, it indicates that the first power supply signal, the three-phase upper bridge arm drive unit 1033, and the second power supply signal are all in the non-fault state. In this case, the first backup control unit 1041 outputs the first potential in the first backup control signal, so that the three-phase upper bridge arm drive unit 1033 continues working.

Further, if the potential of the first power supply diagnosis signal, the upper bridge arm diagnosis signal or the second power supply diagnosis signal suddenly changes from the first potential to the second potential, it indicates that a fault occurs. The first backup control unit 1041 outputs the second potential in the first backup control signal, so that the three-phase upper bridge arm drive unit 1033 stops working.

The second backup control unit 1042 is electrically connected to the first secondary side power supply 1032, the three-phase lower bridge arm drive unit 1036, and the second secondary side power supply 1035 in the drive unit 103, and is configured to: receive the first power supply diagnosis signal outputted by the first secondary side power supply 1032, the lower bridge arm diagnosis signal outputted by the three-phase lower bridge arm drive unit 1036, and the second power supply diagnosis signal outputted by the second secondary side power supply 1035, and adjust, according to the potentials of the first power supply diagnosis signal, the lower bridge arm diagnosis signal, and the second power supply diagnosis signal, the potential of the second backup control signal outputted to the three-phase lower bridge arm drive unit 1036.

Further, if the first power supply diagnosis signal, the lower bridge arm diagnosis signal, and the second power supply diagnosis signal are all at the first potential, it indicates that the first power supply signal, the three-phase lower bridge arm drive unit 1036, and the second power supply signal are all in the non-fault state. In this case, the second backup control unit 1042 outputs the first potential in the second backup control signal, so that the three-phase lower bridge arm drive unit 1036 continues working.

Further, if the potential of the first power supply diagnosis signal, the lower bridge arm diagnosis signal or the second power supply diagnosis signal suddenly changes from the first potential to the second potential, it indicates that a fault occurs. The second backup control unit 1042 outputs the second potential in the second backup control signal, so that the three-phase upper bridge arm drive unit 1036 stops working.

In this embodiment of the present disclosure, the backup control unit 104 may monitor the working statuses of the first power supply signal, the second power supply signal, the three-phase upper bridge arm drive unit 1033, and the three-phase lower bridge arm drive unit 1036 in real time by receiving the diagnosis signal outputted by the drive unit 103, may control the control drive unit 103 to stop working when any one of the units or signal transmission encounters a fault, and forms a redundant structure for the fault processing of the drive unit 103 together with the control unit 102, thereby improving the risk-resistance capability and safety level of the motor control system 100.

The power unit 105 is electrically connected to the drive unit 103, and is configured to output, under control of the high-voltage drive signal outputted by the drive unit 103, the power supply drive signal provided by the high-voltage battery 300 to the motor 200. The power supply drive signal is used for driving the motor 200 to rotate.

In this embodiment of the present disclosure, when the drive unit 103 works normally, the first primary side power supply 1031 outputs the first primary side power supply signal from the primary side of the three-phase upper bridge arm drive unit 1033, and the first secondary side power supply 1032 outputs the first secondary side power supply signal from the secondary side of the three-phase upper bridge arm drive unit 1033, so that when simultaneously receiving the first potential of the upper bridge arm enable signal and the first potential of the safety enable signal outputted by the control unit 102, the three-phase upper bridge arm drive unit 1033 can start outputting the upper bridge arm high-voltage drive signal to the power unit 105 after performing voltage transformation on the upper bridge arm low-voltage drive signal. Therefore, the power unit 105 may convert the upper bridge arm low-voltage drive signal into the power supply drive signal that enables the motor to rotate.

In this embodiment of the present disclosure, if the three-phase upper bridge arm drive unit 1033 in the drive unit encounters a fault, the three-phase upper bridge arm drive unit 1033 outputs the upper bridge arm fault signal to the main control unit 1024, and the main control unit 1024 changes the upper bridge arm enable signal from the first potential to the second potential, and stops outputting the upper bridge arm low-voltage drive signal, so that the three-phase upper bridge arm drive unit 1033 stops working. In addition, the three-phase upper bridge arm drive unit 1033 further changes the upper bridge arm diagnosis signal outputted to the first backup control unit 1034 from the first potential to the second potential, and the first backup control unit 1041 changes the first backup control signal from the first potential to the second potential, so that the three-phase upper bridge arm drive unit 1033 stops working. In this redundant fault processing manner, when the main control unit 1024 fails to stop the drive unit 103 in time from working due to power providing or other faults, the backup control unit 104 may control the drive unit 103 to stop working, so that a motor apparatus to which the motor control system 100 is applied has a higher safety level.

In this embodiment of the present disclosure, the three-phase upper bridge arm drive unit 1033 and the three-phase lower bridge arm drive unit 1036 in the drive unit 103 are arranged symmetrically, and manners of the three-phase lower bridge arm drive unit 1036 when the three-phase lower bridge arm drive unit works normally and encounters a fault are similar to those of the three-phase upper bridge arm drive unit 1033. Details are not described again. In addition, when the motor control system 100 works normally, only the three-phase upper bridge arm drive unit 1033 or the three-phase lower bridge arm drive unit 1037 works in a same period of time, and the two units do not work simultaneously. If the three-phase upper bridge arm drive unit 1033 stops working due to a fault, the drive unit 103 enables the three-phase lower bridge arm drive unit 1037 to start working, to ensure that the electric apparatus can be in a relatively safe running state.

In this embodiment of the present disclosure, a motor control apparatus is further provided, including the foregoing motor control system 200.

In the motor control system 100 according to this embodiment of the present disclosure, a switching unit 1015 is added to a power providing unit 101, and switches between a first direct current voltage outputted by a battery unit 1011 and a third direct current voltage outputted by a first transformation unit 1013 for outputting, to switch from one signal to another signal in time when the one signal encounters a fault, thereby improving the power providing safety of an electric apparatus to which the motor control system 100 is applied during running. In addition, a backup control unit 104 is further added to the motor control system 100, which can form a redundant fault control structure with the control unit 102 when the drive unit 103 encounters a fault. That is, when the control unit 102 fails to stop the drive unit 103 from working, the backup control unit 104 can control the drive unit 103 to stop working. It can be learned that in the motor control system 100, through the improvement of the power providing unit 101 and the addition of the backup control unit 104, the safety level of the electric apparatus to which the motor control system 100 is applied is improved.

The motor control system and the motor control apparatus provided in the embodiments of the present disclosure are described in detail above. The principle and implementations of the present disclosure are described herein through specific embodiments. The description of the foregoing embodiments is merely used for helping understand the method and core idea of the present disclosure. Besides, a person of ordinary skill in the art may make alterations to the specific implementations and application scope according to the idea of the disclosure. In conclusion, the content of this specification shall not be understood as a limitation on the present disclosure.

What is claimed is:

1. A motor control system, comprising a drive unit, a backup control unit, and a power unit, wherein
the drive unit is electrically connected to the power unit, and is configured to convert a received low-voltage drive signal into a high-voltage drive signal and output the high-voltage drive signal to the power unit, the power unit outputs, according to the high-voltage drive signal, a power supply drive signal provided by a high-voltage battery, and the power supply drive signal is configured to drive a motor connected to the power unit to rotate; and
the backup control unit is electrically connected to the drive unit, the drive unit is configured to output a diagnosis signal indicating a running status of the drive unit to the backup control unit, and if the diagnosis signal received by the backup control unit indicates that the drive unit is in a fault state, the backup control unit controls the drive unit to stop working, so that the drive unit stops outputting the high-voltage drive signal to the power unit, to control the motor to stop rotating,
wherein the motor control system further comprises a control unit;
the control unit is electrically connected to the drive unit, and is configured to output an enable signal and the low-voltage drive signal to the drive unit, and the enable signal is used for controlling the drive unit to start or stop converting the low-voltage drive signal into the high-voltage drive signal; and
when a fault occurs, the drive unit outputs a fault signal to the control unit, the fault signal is used for indicating that the drive unit is in the fault state, and the control unit stops, according to the fault signal, outputting the low-voltage drive signal, and adjusts a potential of the enable signal, to control the drive unit to stop outputting the high-voltage drive signal.

2. The motor control system according to claim 1, wherein the drive unit comprises a first primary side power supply, a first secondary side power supply, and a three-phase upper bridge arm drive unit, wherein
the first primary side power supply is electrically connected to the three-phase upper bridge arm drive unit, is configured to output a first primary side power supply signal to the three-phase upper bridge arm drive unit after processing a received first power supply signal, and is further configured to stop outputting the first primary side power supply signal to the three-phase upper bridge arm drive unit when receiving an upper bridge arm fault signal in the fault signal outputted by the three-phase upper bridge arm drive unit; and
the first secondary side power supply is electrically connected to the three-phase upper bridge arm drive unit, is configured to output a first secondary side power supply signal to the three-phase upper bridge arm drive unit after processing the received first power supply signal, and is further configured to: receive an upper bridge arm diagnosis signal in the diagnosis signal outputted by the three-phase upper bridge arm drive unit, and stop outputting the first secondary side power supply signal to the three-phase upper bridge arm drive unit when the upper bridge arm diagnosis signal indicates that the three-phase upper bridge arm drive unit is in a fault state, and the upper bridge arm diagnosis signal is used for indicating the fault state and a non-fault state of the three-phase upper bridge arm drive unit.

3. The motor control system according to claim 2, wherein the three-phase upper bridge arm drive unit is configured to: receive, under driving actions of the first primary side power supply signal and the first secondary side power supply signal, the enable signal and an upper bridge arm low-voltage drive signal in the low-voltage drive signal outputted by the control unit, and convert the upper bridge arm low-voltage drive signal into an upper bridge arm high-voltage drive signal in the high-voltage drive signal;
the three-phase upper bridge arm drive unit is further configured to output the upper bridge arm fault signal to the first primary side power supply, so that the first primary side power supply stops outputting the first primary side power supply signal to the three-phase upper bridge arm drive unit when receiving the upper bridge arm fault signal indicating that the three-phase upper bridge arm drive unit encounters a fault, and the three-phase upper bridge arm drive unit stops receiving the enable signal and the upper bridge arm low-voltage drive signal outputted by the control unit; and
the three-phase upper bridge arm drive unit is further configured to output the upper bridge arm diagnosis signal to the first secondary side power supply, so that the first secondary side power supply stops outputting the first secondary side power supply signal to the three-phase upper bridge arm drive unit when receiving the upper bridge arm diagnosis signal indicating the fault state of the three-phase upper bridge arm drive unit, and the three-phase upper bridge arm drive unit stops converting the upper bridge arm low-voltage drive signal into the upper bridge arm high-voltage drive signal.

4. The motor control system according to claim 2, wherein the drive unit further comprises a second primary side power supply, a second secondary side power supply, and a three-phase lower bridge arm drive unit, wherein the second primary side power supply is electrically connected to the three-phase lower bridge arm drive unit, is configured to output a second primary side power supply signal to the three-phase lower bridge arm drive unit after processing a received first power supply signal, and is further configured to stop outputting the second primary side power supply signal to the three-phase lower bridge arm drive unit when receiving a lower bridge arm fault signal in the fault signal outputted by the three-phase lower bridge arm drive unit; and the second secondary side power supply is electrically connected to the three-phase lower bridge arm drive unit, is configured to output a second secondary side power supply signal to the three-phase lower bridge arm drive unit after processing a received second power supply signal, and is further configured to: receive a lower bridge arm diagnosis signal in the diagnosis signal outputted by the three-phase lower bridge arm drive unit, and stop outputting the second secondary side power supply signal to the three-phase lower bridge arm drive unit when the lower bridge arm diagnosis signal indicates that the three-phase lower bridge arm drive unit is in a fault state, and the lower bridge arm diagnosis signal is used for indicating the fault state and a non-fault state of the three-phase lower bridge arm drive unit.

5. The motor control system according to claim 4, wherein the three-phase lower bridge arm drive unit is configured to: receive, under driving actions of the second primary side power supply signal and the second secondary side power supply signal, the enable signal and a lower bridge arm low-voltage drive signal in the low-voltage drive signal outputted by the control unit, and convert the lower bridge arm low-voltage drive signal into a lower bridge arm high-voltage drive signal in the high-voltage drive signal;

the three-phase lower bridge arm drive unit is further configured to output the lower bridge arm fault signal to the second primary side power supply, so that the second primary side power supply stops outputting the second primary side power supply signal to the three-phase lower bridge arm drive unit when receiving the lower bridge arm fault signal indicating that the three-phase lower bridge arm drive unit encounters a fault, and the three-phase lower bridge arm drive unit stops receiving the enable signal and the lower bridge arm low-voltage drive signal outputted by the control unit; and the three-phase lower bridge arm drive unit is further configured to output the lower bridge arm diagnosis signal to the second secondary side power supply, so that the second secondary side power supply stops outputting the second secondary side power supply signal to the three-phase lower bridge arm drive unit when receiving the lower bridge arm diagnosis signal indicating the fault state of the three-phase lower bridge arm drive unit, and the three-phase lower bridge arm drive unit stops converting the lower bridge arm low-voltage drive signal into the lower bridge arm high-voltage drive signal.

6. The motor control system according to claim 4, wherein the backup control unit comprises a first backup control unit, wherein the first secondary side power supply is electrically connected to the first backup control unit, and is configured to output a first power supply diagnosis signal in the diagnosis signal to the backup control unit after detecting the first power supply signal, the first power supply diagnosis signal is used for indicating a working status of the first power supply signal, and the working status of the first power supply signal comprises a fault state and a non-fault state;

the second secondary side power supply is electrically connected to the first backup control unit, and is configured to output a second power supply diagnosis signal in the diagnosis signal to the backup control unit after detecting the second power supply signal, the second power supply diagnosis signal is used for indicating a working status of the second power supply signal, and the working status of the second power supply signal comprises a fault state and a non-fault state; and the first backup control unit is further electrically connected to the three-phase upper bridge arm drive unit, and is configured to receive the upper bridge arm diagnosis signal outputted by the three-phase upper bridge arm drive unit, and if the upper bridge arm diagnosis signal or the first power supply diagnosis signal or the second power supply diagnosis signal changes from the non-fault state to the fault state, the first backup control unit outputs a first backup control signal, and controls the three-phase upper bridge arm drive unit to stop converting the upper bridge arm low-voltage drive signal into the upper bridge arm high-voltage drive signal.

7. The motor control system according to claim 6, wherein the backup control unit further comprises a second backup control unit, wherein the first secondary side power supply is electrically connected to the second backup control unit, and is configured to output the first power supply diagnosis signal in the diagnosis signal to the backup control unit after detecting the first power supply signal, the first power supply diagnosis signal is used for indicating the working status of the first power supply signal, and the working status of the first power supply signal comprises the fault state and the non-fault state;

the second secondary side power supply is electrically connected to the second backup control unit, and is configured to output the second power supply diagnosis signal in the diagnosis signal to the backup control unit after detecting the second power supply signal, the second power supply diagnosis signal is used for indicating the working status of the second power supply signal, and the working status of the second power supply signal comprises the fault state and the non-fault state; and the second backup control unit is further electrically connected to the three-phase lower bridge arm drive unit, and is configured to receive the lower bridge arm diagnosis signal outputted by the three-phase lower bridge arm drive unit, and if the lower bridge arm diagnosis signal or the first power supply diagnosis signal or the second power supply diagnosis signal changes from the non-fault state to the fault state, the second backup control unit outputs a second backup control signal, and controls the three-phase lower bridge arm drive unit to stop converting the lower bridge arm low-voltage drive signal into the lower bridge arm high-voltage drive signal.

8. The motor control system according to claim 4, further comprising a power providing unit, wherein the power providing unit is electrically connected to the control unit and the drive unit, and is configured to output the first power supply signal to the control unit, the control unit controls running of the drive unit under a driving action of the first power supply signal, and is configured to output the first power supply signal and the second power supply signal to the drive unit, and the drive unit outputs the high-voltage drive signal to the power unit under driving actions of the first power supply signal and the second power supply signal.

9. The motor control system according to claim 8, wherein the power providing unit comprises a battery unit, a high-voltage unit, a first transformation unit, and a switching unit, wherein the battery unit is electrically connected to the switching unit, and is configured to output a first direct current voltage to the switching unit;

the high-voltage unit is electrically connected to the first transformation unit, and is configured to output a second direct current voltage to the first transformation unit, so that the first transformation unit outputs a third direct current voltage to the switching unit electrically connected to the first transformation unit after transforming the second direct current voltage; and the switching unit is electrically connected to the control unit and the drive unit, is configured to output the first direct current voltage as the first power supply signal to the control unit and the drive unit when the first direct current voltage is in a threshold range, and is further configured to output the third direct current voltage as the first power supply signal to the control unit and the drive unit when the first direct current voltage exceeds the threshold range.

10. The motor control system according to claim 9, wherein the power providing unit further comprises a second transformation unit, and the second transformation unit is electrically connected to the high-voltage unit, and is configured to receive the second direct current voltage outputted by the high-voltage unit; and the second transformation unit is further electrically connected to the drive unit, and is configured to output the second power supply signal to the drive unit after transforming the second direct current voltage, and the second power supply signal and the first power supply signal jointly drive the drive unit to output the high-voltage drive signal to the power unit.

11. A motor control apparatus, comprising a motor control system, the motor control system comprises:

a drive unit, a backup control unit, and a power unit, wherein:

the drive unit is electrically connected to the power unit, and is configured to convert a received low-voltage drive signal into a high-voltage drive signal and output the high-voltage drive signal to the power unit, the power unit outputs, according to the high-voltage drive signal, a power supply drive signal provided by a high-voltage battery, and the power supply drive signal is configured to drive a motor connected to the power unit to rotate; and the backup control unit is electrically connected to the drive unit, the drive unit is configured to output a diagnosis signal indicating a running status of the drive unit to the backup control unit, and if the diagnosis signal received by the backup control unit indicates that the drive unit is in a fault state, the backup control unit controls the drive unit to stop working, so that the drive unit stops outputting the high-voltage drive signal to the power unit, to control the motor to stop rotating, wherein the motor control system further comprises a control unit;

the control unit is electrically connected to the drive unit, and is configured to output an enable signal and the low-voltage drive signal to the drive unit, and the enable signal is used for controlling the drive unit to start or stop converting the low-voltage drive signal into the high-voltage drive signal; and when a fault occurs, the drive unit outputs a fault signal to the control unit, the fault signal is used for indicating that the drive unit is in the fault state, and the control unit stops, according to the fault signal, outputting the low-voltage drive signal, and adjusts a potential of the enable signal, to control the drive unit to stop outputting the high-voltage drive signal.

* * * * *